April 27, 1965    D. T. A. MILLER    3,180,359
PRESSURE RATIO SWITCH
Filed Oct. 25, 1962    2 Sheets-Sheet 1

INVENTOR.
DAVID T. A. MILLER
BY

April 27, 1965

D. T. A. MILLER 3,180,359

PRESSURE RATIO SWITCH

Filed Oct. 25, 1962

INVENTOR.
DAVID T.A. MILLER
BY 3,180,359
PRESSURE RATIO SWITCH
David T. A. Miller, Torrance, Calif., assignor to Whittaker Corporation, a corporation of California
Filed Oct. 25, 1962, Ser. No. 233,079
14 Claims. (Cl. 137—625.4)

This invention relates to a pressure ratio switch and more particularly to an actuating device which provides a snap-action in response to a predetermined differential pressure. The instant invention solves a problem that heretofore has been existent in the actuating mechanism industry in a manner hereafter shown.

There are many practical applications for actuating mechanisms which have a snap-action response to separate sets of pressure values. Heretofore, most actuating mechanisms which were responsive to a variable pressure or differential pressure moved into operative position in a linear fashion, that is, the amount of displacement of the actuating arm of an actuator was substantially directly proportional to the amount in change in pressure or change in pressure differential. Attempts have been made to provide a snap-acting open and close device responsive to at least two levels of pressure as shown in the patent to Robert C. Wright, Jr., U.S. Patent No. 2,858,840, but all such attempts proved to be commercially valueless inasmuch as a plurality of operating elements were required, involving additional fabrication problems and costs as well as an inherently decreased reliability.

The instant invention provides an actuating device responsive to a plurality of pressure ratios which has a snap-action response and which achieves this result by use of a novel valve structure having a minimum of operating elements. The invention is a simple construction being made of standard parts, and can be manufactured at reasonable cost.

The reliability of the device is much greater than similar actuating devices, due mainly to its simplicity of construction and operation and the absence of numerous operative elements.

More specifically, the invention comprises a housing having a piston-like member inserted therein. The disc-like upper portion of the piston in conjunction with a plurality of bellows serves to divide the housing into a first and second chamber with no communication therebetween, except as hereinafter described. The upper chamber has a first source of pressure $P_1$ communicating therewith, said pressure exerting a force upon the upper surface of the piston. The lower chamber has a second source of pressure $P_2$ communicating therewith, said second pressure $P_2$ exerting a force on the lower side of the piston. The area $A_1$ on the upper surface of the piston, subject to the high pressure $P_1$, is smaller than the area $A_2$ on the lower surface of the piston, subject to the lower pressure $P_2$. Since the total force exerted on the piston is determined by the force exerted per unit area, it is apparent that a state of equilibrium will be reached if the ratio of $P_2$ over $P_1$ is the same as the ratio of $A_1$ over $A_2$.

Starting in the state of equilibrium, it is apparent that an increase in the ratio $P_2$ over $P_1$ will result in movement of the piston upward while a decrease in the ratio $P_2$ over $P_1$ will result in the piston being moved downward. This actuating concept is well-known in the prior art. However, applicant provides a novel means for achieving a snap-action response, such that when a critical predetermined ratio $P_2$ over $P_1$ equals a first value, the actuating arm will move with a snap-action in a first direction. Again, when the critical ratio then reaches a second predetermined value, the actuating arm will move with a snap-action in a direction which is a reverse of the first direction. These two critical ratios can be predetermined, their specific values being dependent on the critical ratio desired for actuating the valve as well as the design characteristics of the areas on the piston face which are exposed to the respective pressures $P_1$ and $P_2$.

A further novel feature of this invention is the so-called "deadband" that exists between the two critical pressures heretofore mentioned. If the particular pressure ratio $P_1/P_2$ is a value which lies between these two extreme critical pressure points, no substantial movement of the actuating piston takes place. This results in a so-called "deadband" effect.

The invention is more readily described by reference to the attached FIGURES 1, 2, 3, and 4.

Figure 1:
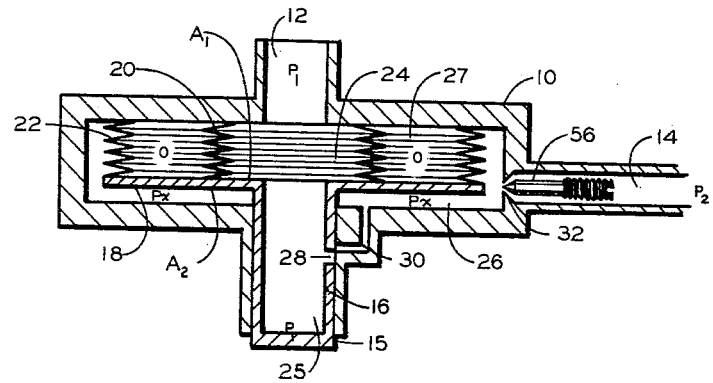
FIGURE 1 is a cutaway view of the valve wherein the valve is in a downwardly depressed condition.

More specifically, FIGURE 1 consists of an actuating mechanism having a casing 10 with a first inlet port 12 and a second inlet port 14, said inlet port 12 communicating with a first pressure source $P_1$ and said inlet port 14 communicating with a second pressure source $P_2$, pressure $P_2$ being lower than pressure $P_1$. A bore 15 exists in the lower part of the casing 10 and which is adapted to contain a sliding, piston-like member 16 therein. The piston-like member 16 is contained within the casing 10 and has a disc-like portion 18. An inner bellows 20 and an outer bellows 22 is attached between the disc-like portion 18 and the casing 10 by suitable means, such as welding. The bellows 20 and 22 form a chamber 0 therein in which a vacuum is maintained. There is no communication between the area formed within the bellows 20 and 22 and the pressure ports 12 and 14.

The interior of the bellows 20 surrounds a first chamber 24 which communicates with pressure $P_1$ via port 12. The outer bellows 22 aids in the formation of a second chamber 26 which communicates via restriction 32 with inlet port 14 communicating with pressure $P_2$. The slidable extension 16 has a cavity 25 and an opening 28 therein.

The casing 10 itself has a channel 30 therein which serves as a means of communication between the two pressure chambers 24 and 26. Chamber 26 communicates with the inlet port 14 via a restriction 32 having an adjustable needle member 56 contained therein. The position of the needle member 56 determines the flow of fluid between inlet port 14 and chamber 26.

It is apparent that under static conditions the higher pressure $P_1$ is applied downward against a relatively small area $A_1$ on the upper side of the disc 18 and that the lower pressure $P_2$ is applied upward against a much larger area $A_2$ on the underside of the disc 18. Since the pressure exerted in a particular direction is a function of the pressure times its effective area, the piston will seek an equilibrium position at which the higher pressure $P_1$ exerted against a relatively small upper surface $A_1$ of the disc 18 balances the upward thrust of the lower pressure $P_2$ against the larger undersurface of the disc at $A_2$. Any decrease in the pressure of $P_2$ will serve to cause a movement of the piston-like member downward while an increase in the pressure $P_2$ would cause the piston-like member to move upward.

The operation of the device is as follows: when the piston member 16 is in a downward position as shown in FIGURE 1, the opening 28 does not communicate with channel 30 and therefore two separate pressures are exerted on the disc 18. The pressure in chamber 26 ($P_x$) approximates the pressure $P_2$. However, if the pressure $P_2$ is increased, pressure $P_x$ will correspondingly be increased since it approximates pressure $P_2$, thereby exerting a total force upon the lower side of disc 18 greater than the total force exerted on the upper side of disc 18, thereby tending to drive the piston upwards, the equilibrium having been unbalanced. As the piston moves upwards, opening 28 moves across the channel 30 opening a passage of communication between chambers 24 and 26 via opening 28 and channel 30. Since $P_1$ is greater than $P_2$, this opening of the passage 30 will cause a flow of fluid from chamber 24 to 26 further increasing the pressure $P_x$ and more rapidly causing the piston 16 to move upwards, resulting in the so-called snap-action. The presence of the needle valve 56 in the orifice 32 maintains the pressure $P_x$ at a value which is intermediate pressures $P_1$ and $P_2$ so that when the channel 30 is open, the piston-like member 16 is maintained in an upward position.

It can be seen that the only way piston 16 would move downward again would be on a change in the ratio between $P_1$ and $P_x$, $P_x$ being at a higher value than $P_2$. Since $P_x$ at this point is greater than $P_2$, $P_2$ would have to drop to a value lower than its original value to bring about the original equilibrium position. The lowering of the pressure $P_2$ to a point wherein $P_x$ acting on the lower side of disc 18 is insufficient to overcome the pressure $P_1$ acting on the upper side of piston 18 will cause the piston member 16 to move downward. As piston member 16 moves downward, the channel 30 is closed off since opening 28 moves past the channel 30. This closing of the channel 30 restricts the flow of pressure between chambers 24 and 26 thereby further and more rapidly decreasing pressure $P_x$ which begins to more closely approximate $P_2$, resulting in a snap-action or acceleration movement of the piston downward. When the channel 30 is completely closed due to the piston 16 being in a downward position, the pressure $P_x$ is again substantially equal to the pressure $P_2$ and we have the end of one complete cycle operation.

It should be noted that the pressure $P_x$ in chamber 26 lies between the pressure $P_1$ and $P_2$ when opening 28 is across channel 30 due to the fact that a restriction 32 is present between chamber 26 and pressure source 14. The amount of pressure transfer from channel 30 or orifice 14 is restricted at 32 thereby maintaining pressure $P_x$ above $P_2$.

Figure 2:
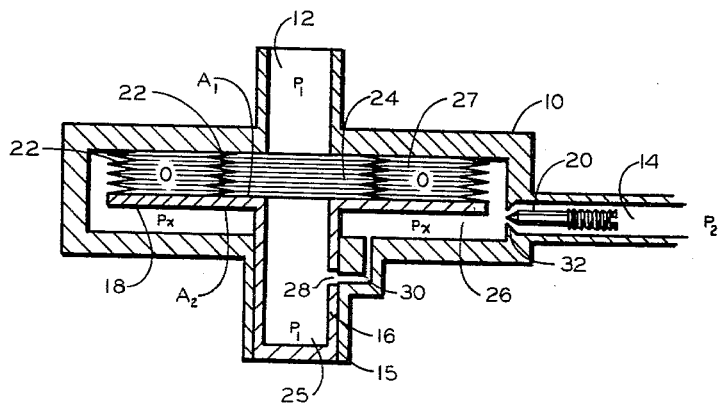
FIGURE 2 is a showing of the same embodiment shown in FIGURE 1, except that the actuating mechanism is raised showing communication between the first chamber and the second chamber.

FIGURE 2 is a showing of the actuating mechanism wherein the piston is moved to an upward position, thereby having chamber 24 communicate with chamber 26.

Figure 4:
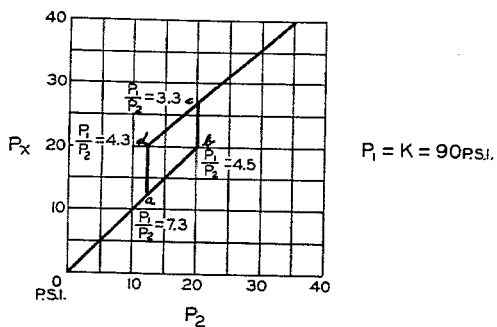
FIGURE 4 is a graph of various pressures and is utilized to explain the device's mode of operation.

The so-called "deadband" effect is more readily understood with reference to FIGURE 4 and the following chart.

*Chart No. 1*

| | | | | | | |
|---|---|---|---|---|---|---|
| $P_1$ | 90 | 90 | 90 | 90 | 90 | 90 |
| $P_x$ | 10 | 20 | 27 | 20.1 | 20 | 12.3 |
| $P_2$ | 10 | 20 | 20.1 | 12.3 | 12.2 | 12.3 |
| $P_1/P_x$ | 9.0 | 4.5 | 3.3 | 4.5 | 4.5 | 7.3 |
| $P_1/P_2$ | 9.0 | 4.5 | 4.5 | 7.3 | 7.3 | 7.3 |
| Actuator Position | Down | Down | Up | Up | Down | Down |

$A_1 = 1$ in.$^2$    $A_2 = 9$ in.$^2$    $P_1 = K = 90\#$

In the above chart, the following data is assumed for purposes of explanation:

(1) $P_1 = 90\# = K$.

(2) When the channel 30 between pressure chambers 24 and 26 is open, $P_x$ will lie at a point intermediate the pressures $P_1$ and $P_2$, which pressure, for purposes of illustration, shall be considered to be the value of $P_2$ plus 10% of the difference in pressure between $P_1$ and $P_2$. It will be appreciated that the value of $P_x$ is determined by the particular pressures involved and the respective areas of the openings 30 and 32, which factors can be varied to conform to desired design characteristics.

(3) The piston 18 will necessarily be in a state of equilibrium when the ratio of $P_1/P_2 = 9.0$ if the ratio $A_1/A_2$ is 1/9.

(4) Upward forces exerted upon the bellows 20 and 22 will be counteracted by the inherent spring return force of the resilient bellows.

It can be seen from the chart that an increase in $P_2$ from 10 to 20 results in a movement of the opening 28 in member 16 into close proximity to channel 30. Since there is no communication between chamber 24 and chamber 26, the pressure $P_x$, exerted on the underside of the disc 18, is substantially equal to pressure $P_2$. At this point, a slight increase in pressure $P_2$ (and accordingly $P_x$) to 20.1 results in a partial opening of the channel 30 allowing pressure $P_1$ from chamber 24 to flow into the chamber 26. This increases the pressure $P_x$ in chamber 26, resulting in a greater pressure being applied to the underside of disc 18. There is a rapid upward movement of the piston to a point where the channel 30 is completely uncovered. The pressure $P_x$ seeks and maintains a value intermediate the values of pressures $P_1$ and $P_2$, due to the restrictive opening 30 and 32. With the values previously assumed for $P_1$ and $P_2$, $P_x$ is now equal to 27 pounds.

From the chart it can be seen that the device was triggered when the ratio $P_1/P_2$ reached 4.5. However, the effective pressure ratio acting on the piston when in the raised position, $P_1/P_x$, is now a ratio of 3.3. It is readily apparent that the ratio $P_1/P_2$ must rise to a value considerably higher than 4.5 to cause a downward movement of the piston since the effective ratio $P_1/P_x$ trails the ratio of $P_1/P_2$.

As the value of $P_2$ drops to 12.3 pounds, the value of $P_x$ approaches 20 pounds, reaching the effective critical operating ratio acting on the piston of 4.5. At this point in time, member 16 starts closing off channel 30 resulting in a lowering of pressure $P_x$ independent of pressure $P_2$. This lowering of pressure $P_x$ increases the downward movement of the piston until channel 30 is completely closed off and $P_x$ again approximates $P_2$. This completes a full cycle of operation.

From the above chart it can readily be seen that a change in the pressure $P_2$ between 20 pounds and 12.3 pounds did not result in a substantial change in the position of the piston. However, on passing each of these critical pressure values, a snap-action movement of the piston was achieved. That is to say, a "deadband" existed between the pressure ratio values ($P_1/P_2$) of 7.3 and 4.5.

FIGURE 4 is a graph showing the above described operation. The pressures exerted upon the underside of the piston 18 in chamber 26 follow the curve a–b–c–d–a, the area contained in the trapezoid being a graphic representation of the "deadband," wherein no substantial movement of the piston takes place.

Figure 3:
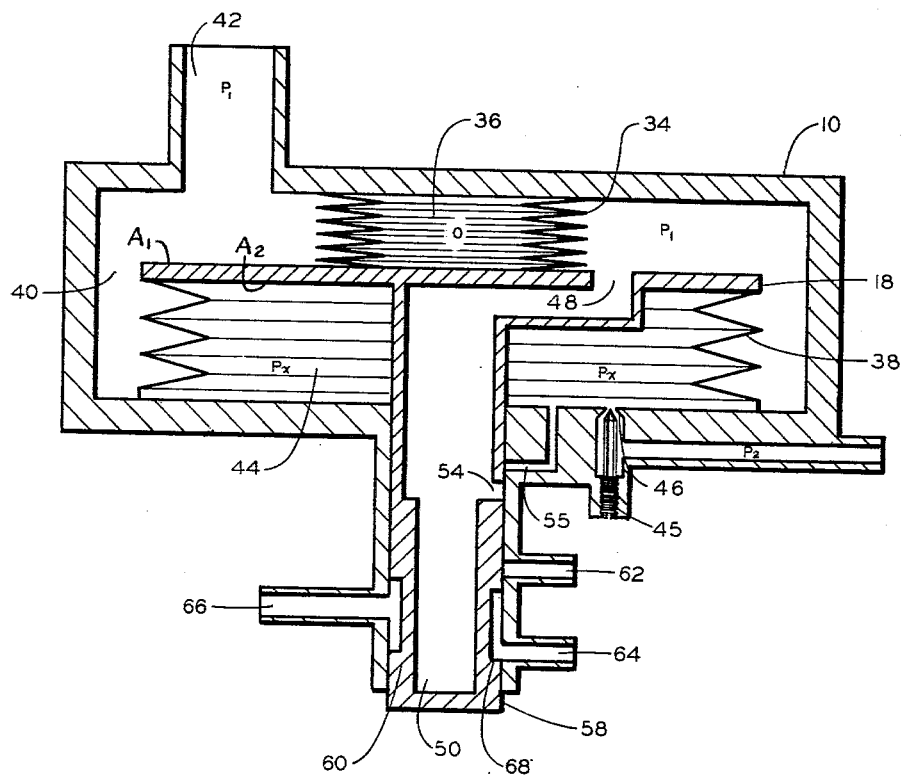
FIGURE 3 is a second embodiment of the invention showing another method of obtaining a differential in pressure on opposite sides of the pistons.

FIGURE 3 is another embodiment of the invention wherein there is a different arrangement of bellows. Furthermore, an actuated mechanism is shown at 50 wherein the snap-action is utilized to operate a transfer valve.

More specifically, the casing 10 contains a plurality of chambers 40 and 44. A first bellows 34 is attached between the upper side of the disc 18 and casing 10, a vacuum being maintained therein at 36. The pressure $P_1$ entering the chamber via inlet opening 42 thereby only acts on part of the upper surface of the disc 18. A second bellows 38 is attached between the lower side of the disc 18 and the chamber 10 to form a second chamber at 44 having a pressure $P_x$ therein. The pressure $P_x$ acts upon the total underside area of the disc 18. An opening 48 is present in the disc 18 which serves as a means of communication between the inlet opening 42 and the hollow piston-like member and extension 60.

In this embodiment, the actuator serves to operate a transfer valve generally shown at 50. When the piston is moved in an upward position, the inlet opening 62 communicates with outlet 66 via passageway 68. When the piston is in the downward position, the gate valve serves to connect inlet port 64 with outlet port 66 via communicating means 68. Either one condition or the other exists, the chambers 62 and 64 never communicating with each other due to the snap-action response of the mechanism.

The actuating mechanism FIGURE 3 operates in a manner similar to the operation of the actuating means shown in FIGURE 1 and FIGURE 2 as above described. The only difference in this embodiment is the method of achieving variation in the pressure applied to the upper and lower surfaces of the disc member 18. The upper surface upon which pressure $P_1$ is applied is smaller than the lower surface of disc 18 upon which the pressure $P_x$ is applied. The opening 54 in the piston-like member 58 serves as a part of the valve with channel 55 which communicates between chambers 44 and 40 which respectively contain the pressures $P_x$ and $P_1$.

It should be noted that other and different embodiments of the invention are possible and the inventor does not intend to limit himself solely to the embodiments shown herein. The particular dimensions of the component parts, such as the areas of the respective channels 55 and openings 32 are determined by design considerations alone. Having set forth the operating principles of my invention and shown and described a practical embodiment of same, what I claim and desire to secure by Letters Patent is:

I claim:

1. An actuating device responsive to variable pressures and
    comprising a first source of pressure,
    a second source of pressure,
    a movable member,
    said first and second sources of pressure being applied to said movable member in opposed directions,
    channel means interconnecting said first and second source of pressure enabling a non-linear snap-action travel of said movable member upon the attainment of a predetermined set of ratios of the values of said first and second pressure sources, whereby substantially no travel of said movable member takes place upon the existence of a pressure ratio intermediate said predetermined set of ratios.

2. An actuating device responsive to variable pressures comprising a casing, said casing having first and second pressure chambers therein,
    a movable member between said first and second pressure chambers responsive to the pressures existent in the respective pressure chambers,
    valve means interconnecting said pressure chambers for providing a snap-action movement of said movable member in a first direction upon the attainment of a first ratio of the pressures in said first and second pressure chambers,
    said valve means also providing a snap-action movement of said movable member in a reverse direction upon the attainment of a second ratio of pressures.

3. An actuating device as set forth in claim 2 including means to vary said first and second pressure ratios.

4. An actuating device responsive to predetermined pressures
    comprising a casing,
    a first chamber in said casing connected to a first pressure source,
    a second chamber in said casing connected to a second source of pressure,
    a movable element responsive to the pressures existent in the first and second chambers,
    said movable element having an upper disc-like portion and a lower hollow extension,
    a channel in said casing in constant communication with said second pressure chamber,
    an orifice in said hollow extension, which, upon the attainment of a predetermined pressure ratio, is aligned with said channel to open a passageway between said first and second pressure chamber.

5. An actuating device for a two position instrument including a casing having a first and second pressure chamber therein,
    a first port in said casing for introducing a first pressure into said first pressure chamber,
    a second port in said casing for introducing a second pressure into said second chamber,
    means within said casing separating said first and second chamber including a pair of bellows and
    a mobile member, said mobile member having a disc-like upper portion and a hollow extension connected thereto,
    a bore in said casing adapted to slidably mount said hollow extension therein, said hollow portion of said extension being in direct communication with said first pressure chamber,
    an orifice in said hollow extension,
    a channel in said casing communicating with said bore and said second pressure chamber, whereby a flow of pressure between said first pressure chamber and said second pressure chamber is enabled when said orifice is aligned with said channel.

6. An actuating device for two position mechanism including a housing, said housing having a plurality of bellows therein,
    a movable piston member having an upper disc-like portion and a lower hollow extension, said bellows and piston member cooperating with said housing to form a first and second chamber,
    a first source of pressure outside said housing communicating with said first pressure chamber via a first pressure port,
    a second source of pressure outside said housing communicating with said second pressure chamber via a second pressure port,
    an adjustable restrictive device in said second port,
    a bore in said housing adapted to receive the lower hollow extension of said piston,
    an orifice in said lower extension,
    a channel in said housing serving to connect said second chamber and said bore, whereby when said lower extension is in a first position the channel is covered and when in a second position, the orifice is in line with said channel enabling communication between said first pressure chamber and said second pressure chamber.

7. An actuating device as set forth in claim 6 wherein said bellows are attached to the upper side of the piston.

8. An actuating device as set forth in claim 7 wherein said bellows are mounted concentrically about the longitudinal axis of the piston thereby forming a third pressure chamber.

9. An actuating device as set forth in claim 8 wherein said third pressure chamber has a vacuum therein.

10. An actuating device as set forth in claim 6 wherein one of said bellows is mounted between the upper side of the piston and the housing to form a third chamber therein.

11. An actuating device as set forth in claim 10 wherein a second of said bellows is mounted concentric to said first bellows.

12. An actuating device as set forth in claim 11 wherein said second bellows is mounted between the lower side of said piston and said housing.

13. An actuating device as set forth in claim 8 wherein a vacuum is maintained in said third pressure chamber.

14. An actuating device as set forth in claim 12, and including a transfer valve, said hollow extension having an annular groove therein which forms part of said transfer valve, said transfer valve having two inlet ports and an outlet port whereby movement of said hollow extension enables fluid to pass from one or the other of said inlet ports to said outlet port.

References Cited by the Examiner

UNITED STATES PATENTS 2,858,840  11/58  Wright ---------------- 137—82
3,039,439  6/62  Murek ---------------- 91—25

M. CARY NELSON, *Primary Examiner.*
MILTON KAUFMAN, *Examiner.*